US006830421B1

(12) United States Patent
Broderick

(10) Patent No.: US 6,830,421 B1
(45) Date of Patent: Dec. 14, 2004

(54) CONTAINER EVACUATION APPARATUS

(76) Inventor: Clifford Broderick, 37 Jeanne Dr., Newburgh, NY (US) 12550

( * ) Notice: Subject to any disclaimer, the term of this patent is extended or adjusted under 35 U.S.C. 154(b) by 0 days.

(21) Appl. No.: 09/716,926

(22) Filed: Nov. 20, 2000

(51) Int. Cl.$^7$ .............................................. B65G 65/23
(52) U.S. Cl. ..................................................... 414/422
(58) Field of Search ................................. 414/422, 420

(56) References Cited

U.S. PATENT DOCUMENTS

| 5,379,814 A | * | 1/1995 | Posly ........................... 141/351 |
| 5,388,953 A | * | 2/1995 | Habicht ................... 414/420 X |
| 5,489,182 A | * | 2/1996 | Habicht ....................... 414/420 |
| 6,024,482 A | * | 2/2000 | Heyraud ...................... 366/216 |

FOREIGN PATENT DOCUMENTS

| DE | 3238245 | * | 4/1984 | ................. 414/422 |
| SU | 1008122 | * | 3/1983 | ................. 414/422 |

* cited by examiner

Primary Examiner—James W. Keenan

(57) ABSTRACT

An apparatus for inverting a container is disclosed. The apparatus has a column that is generally vertically disposed and having a base end connected to a floor plate that can rest on a floor and a top end at the end of the column opposite the base end. The column is capable of rotating about the floor plate and the column has a carriage that moves vertically within the column. The carriage has connected thereto an arm that moves in a horizontal plane. The arm inverts a container such that the contents of the container may be removed.

18 Claims, 17 Drawing Sheets

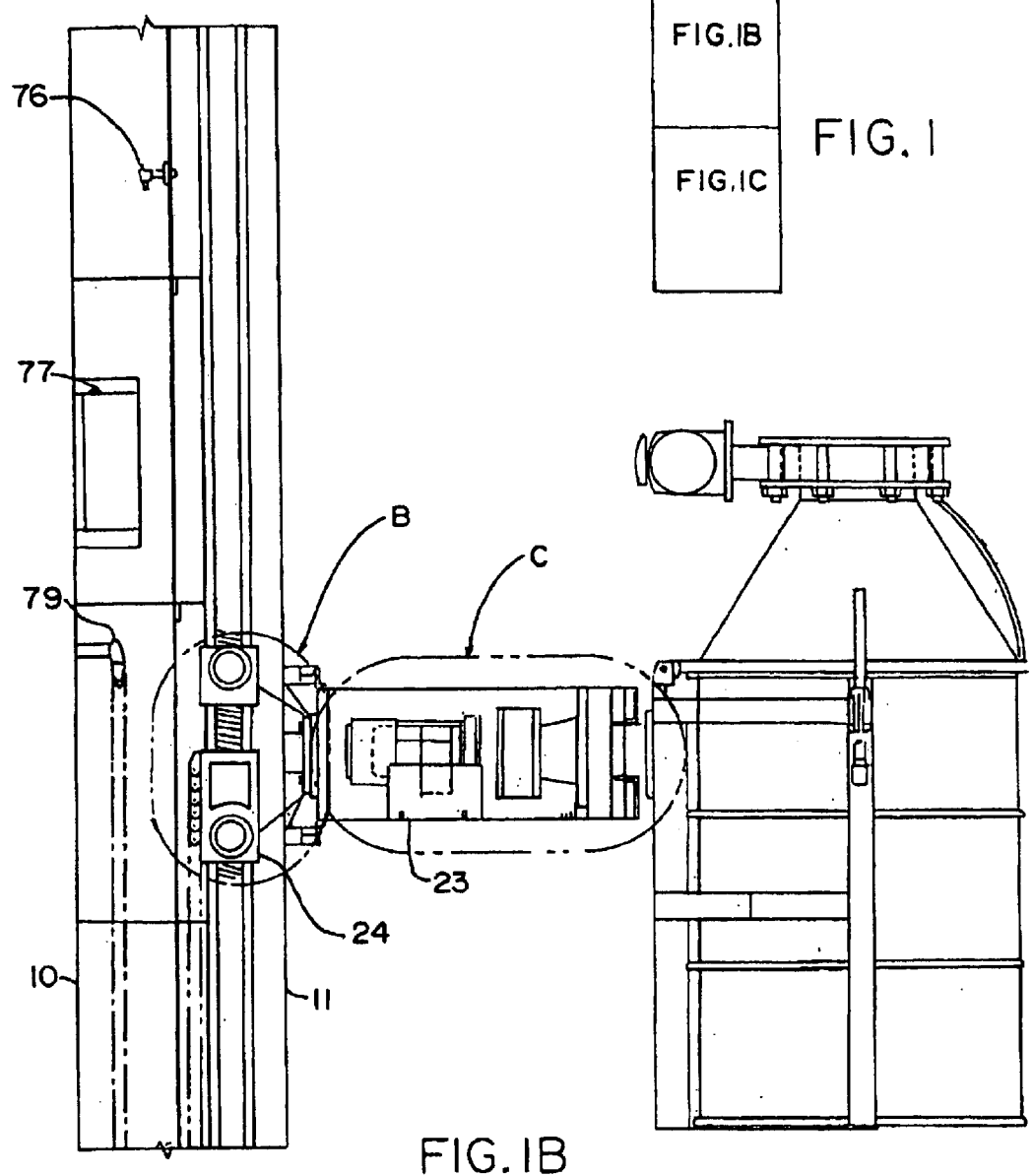

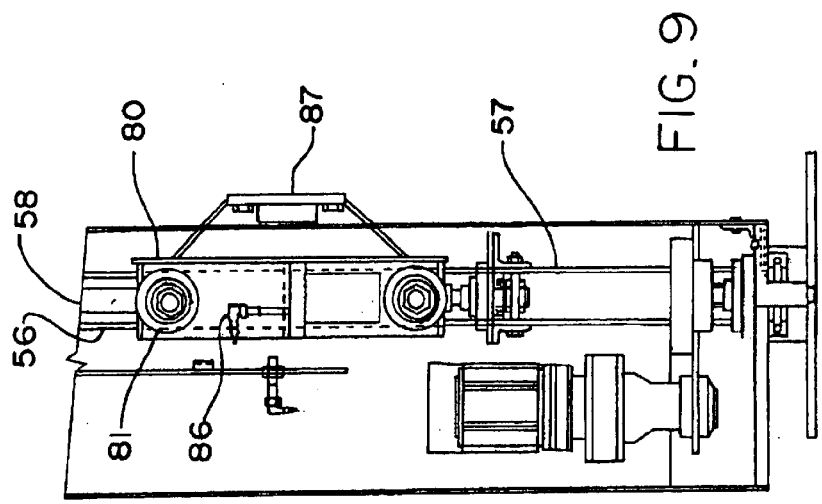
FIG. 9
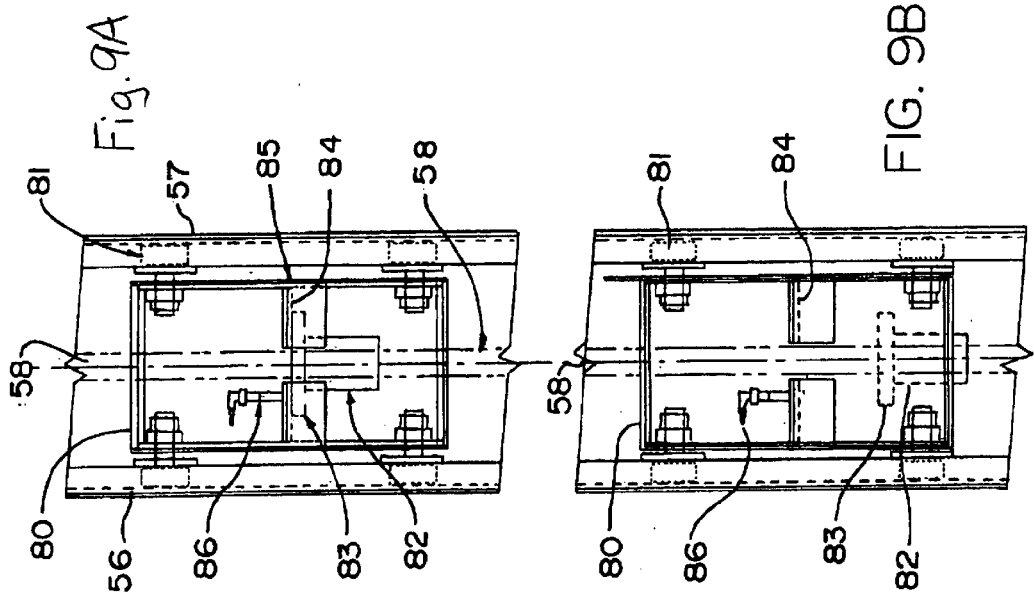
Fig. 9A
FIG. 9B

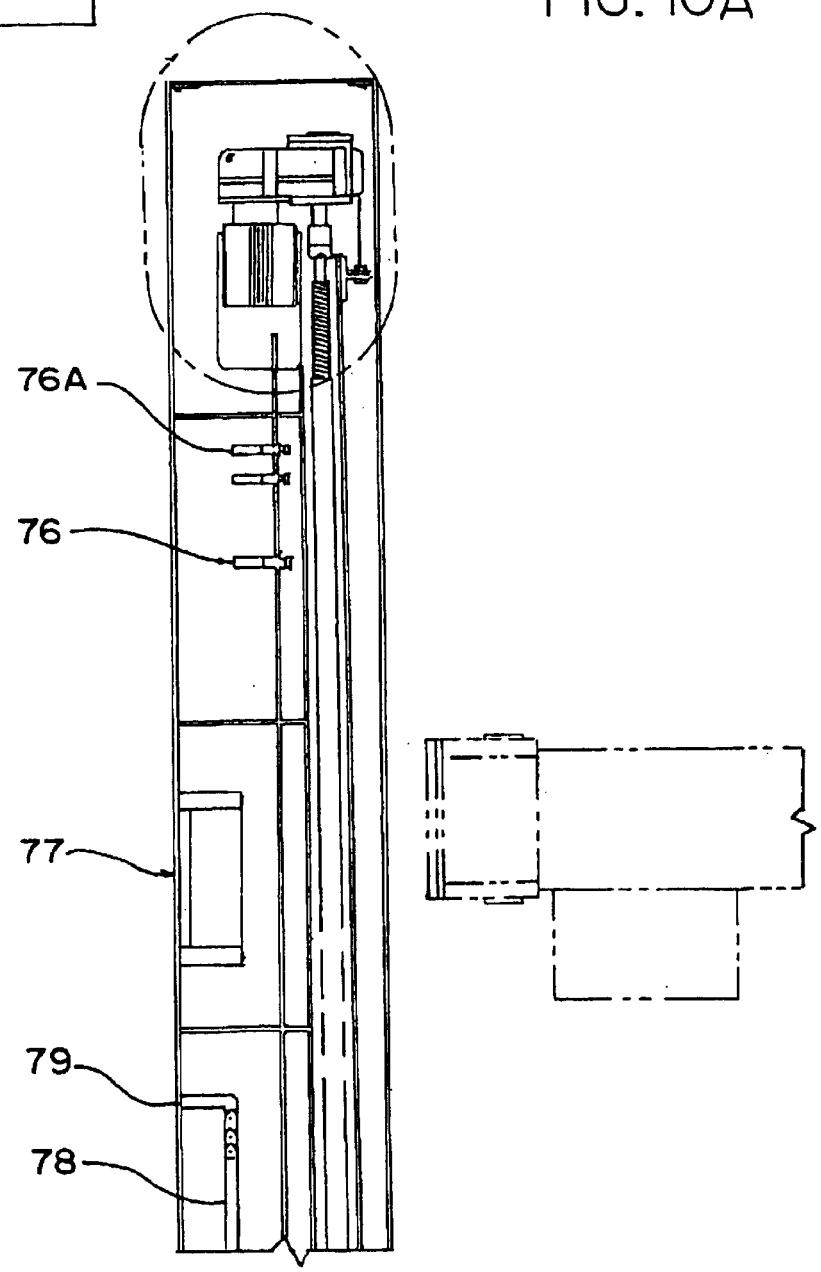

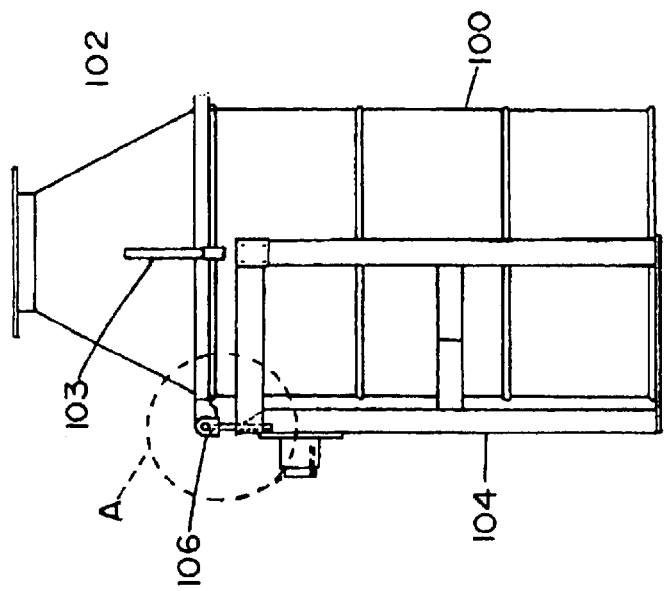
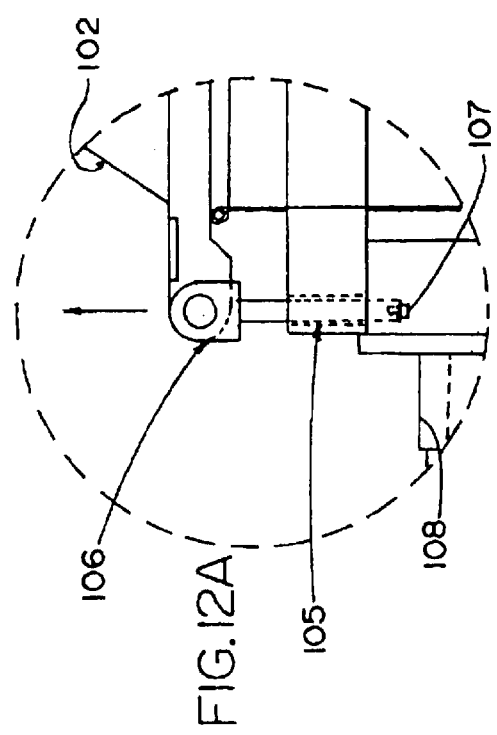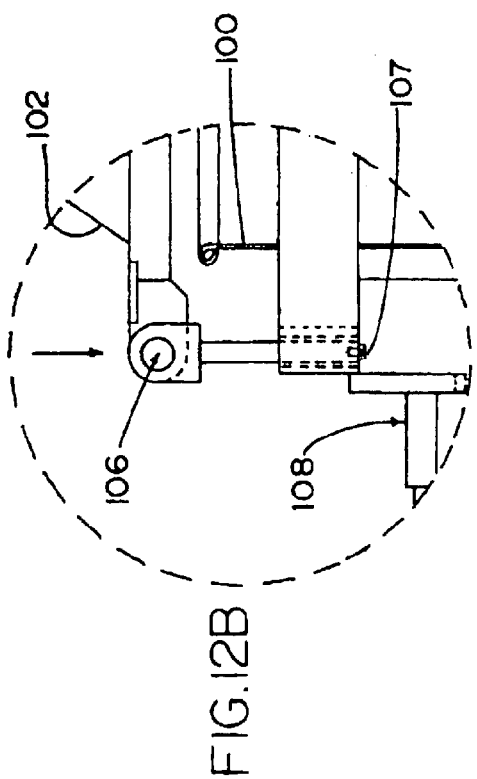

US 6,830,421 B1

CONTAINER EVACUATION APPARATUS

FIELD OF THE INVENTION

The present invention relates to improvements in apparatus for evacuating, tipping and emptying containers including but not limited to barrels, drums and gaylords by inverting the container either partially or fully so that the contents may be removed.

BACKGROUND OF THE INVENTION

In many manufacturing operations particularly in the plastic fabrication, pharmaceutical and other areas, it is not uncommon for some of the materials that are employed in the operation to be shipped to the manufacturing facility in heavy containers such as drums, barrels or gaylords. Drums are typically 55 gallon drums, usually made of plastic or metal, that are cylindrical but can be other shapes as well. Barrels can be the traditional barrels such as those made with staves either of wood or other suitable material including metal and plastic or more modem examples which are made without individual staves. Gaylords are typically cubic corrugated containers although they can be made of other material such as plastic and metal. Each of these containers has in common the fact that they cannot typically be manually inverted without some mechanical aid.

These containers may be delivered by any number of means to the manufacturing facility and are stored until they are required for use in the manufacturing process. The containers can be stored anywhere on the manufacturing site as desired and can be transported from the storage location by any suitable means such as by a fork lift, a conveyor belt, etc. Once the contents of the container are needed, the forklift or other device will remove the container from the storage site and transport it to the location where it is needed. There, the container is either emptied all at once or only portions are removed from time to time on an as needed basis.

For some products contained in the container, such as plastic pellets or powders and the like, a vacuum system or similar conveyance means can be used to remove the material from the drum, either in the storage area or at or near the work site, and transport it through piping or duct work to wherever it is needed for manufacturing purposes. Liquids contained in the drum can be transported in a similar manner. For example, a pump can be used to remove liquids contained in the drum and transport it through pipe to the desired equipment for processing. However, there are frequently other types of materials contained in the drums that cannot be transported in these ways and the container must be tipped or inverted to remove the contents. Such materials could for example be viscous materials that cannot be readily pumped except by complex and expensive means. Other times, the nature of the manufacturing facility is such that the drum, barrel or gaylord must be tipped or inverted to remove the contents. For example, extensive piping for pumping liquids, pellets or powders can be expensive to design, build and maintain. In addition, where there are a variety of mixing or compounding operations being performed in the facility using a variety of different materials it is not always feasible to use piping as the piping would have to be evacuated and flushed of the prior material when each material is used in the system. Because of contamination issues, frequently, these piping systems are only economically feasible where they can be dedicated to one particular type of material for significant periods of time to reduce the frequency that the system must be flushed.

As a result, for many products and manufacturing operations there is a need to have the contents of the drum emptied in a simple cost-effective manner. Since these drums and barrels are large and their contents weigh a considerable amount manually emptying these drums is not feasible and as a result, an apparatus that empties the drum must be used. In some facilities, the drum may be emptied by an apparatus that is mounted on a standard forklift. One advantage of using a forklift to empty a drum is the portability factor. A forklift can lift the drum and bring the drum to any location in the facility for emptying.

Although a drum tipping apparatus attached to a fork lift has the advantage of portability, such apparatus does have limitations in many high volume applications where the vat or receptacle where the contents are to be delivered is relatively large. The maximum distance of travel of the fork on many forklifts is an impediment to using the forklift in many drum tipping applications. As the height of the rails for the fork lift increases the center of gravity of the combination of the barrel and the rails on the forklift can create a tipping hazard that could be injurious to plant personnel and/or waste raw materials. For example, due to the heavy weight of the container as the fork lift raises the container to its maximum height it is possible for the forklift to tip if the floor is uneven or if some other action disturbs the forklift in that position. As a result, many of these devices cannot raise the drum to reach high locations or there are significant restrictions on how far from the forklift the drum may be extended outwardly for tipping. Thus, the forklift is usually only used where the receptacle that the drum content is being delivered to is relatively low and/or the forklift can come relatively close to the receptacle. Accordingly, there is a need for improved apparatus for emptying containers including but not limited to drums, barrels and gaylords by tipping or inverting them to remove the contents.

SUMMARY OF THE INVENTION

It is an object of the present invention to provide an improved apparatus for emptying containers including but not limited to drums, barrels and gaylords and the like.

It is an object of the present invention to provide an apparatus for tipping or inverting containers to remove the contents.

It is an object of the present invention to provide an apparatus that has improved safety features to prevent damage to apparatus when the container is being raised and lowered.

It is a further object of the present invention to provide an apparatus for inverting a container whereby the container is raised and lowered by an arm that articulates in a horizontal plane.

The present invention is directed to an apparatus for inverting a container having a column that is generally vertically disposed and having a base end connected to a floor plate that is adapted to rest on a floor and a top end at the end of the column opposite the base end. The column is capable of rotating about the floor plate. The column has a carriage adapted for vertical movement within the column and the carriage is connected to an arm, the arm has a pair of motors, a first motor which provides the arm with motion in a horizontal plane and a second motor which inverts a container so that the contents of the container may be discharged.

BRIEF DESCRIPTION OF THE DRAWINGS

FIG. 9 is an enlarged view of the carriage of the apparatus of the present invention.

FIG. 9A is a view of the carriage assembly showing the ball nut engaged for vertical travel.

FIG. 9B is a view of the carriage assembly of FIG. 9A wherein an obstruction has been sensed.

FIG. 11A is a view of the arm of FIG. 11 taken along the plane B—B.

FIG. 12 is a side view of the container and cradle of FIG. 10.

FIG. 12A is an enlarged view of the hinge on the cradle of FIG. 12.

FIG. 12B is an enlarged view of the hinge on the cradle of FIG. 12 where the hinge is partially raised to show how the cradle can accommodate a larger container.

DETAILED DESCRIPTION OF THE DRAWINGS

Figure 1A:
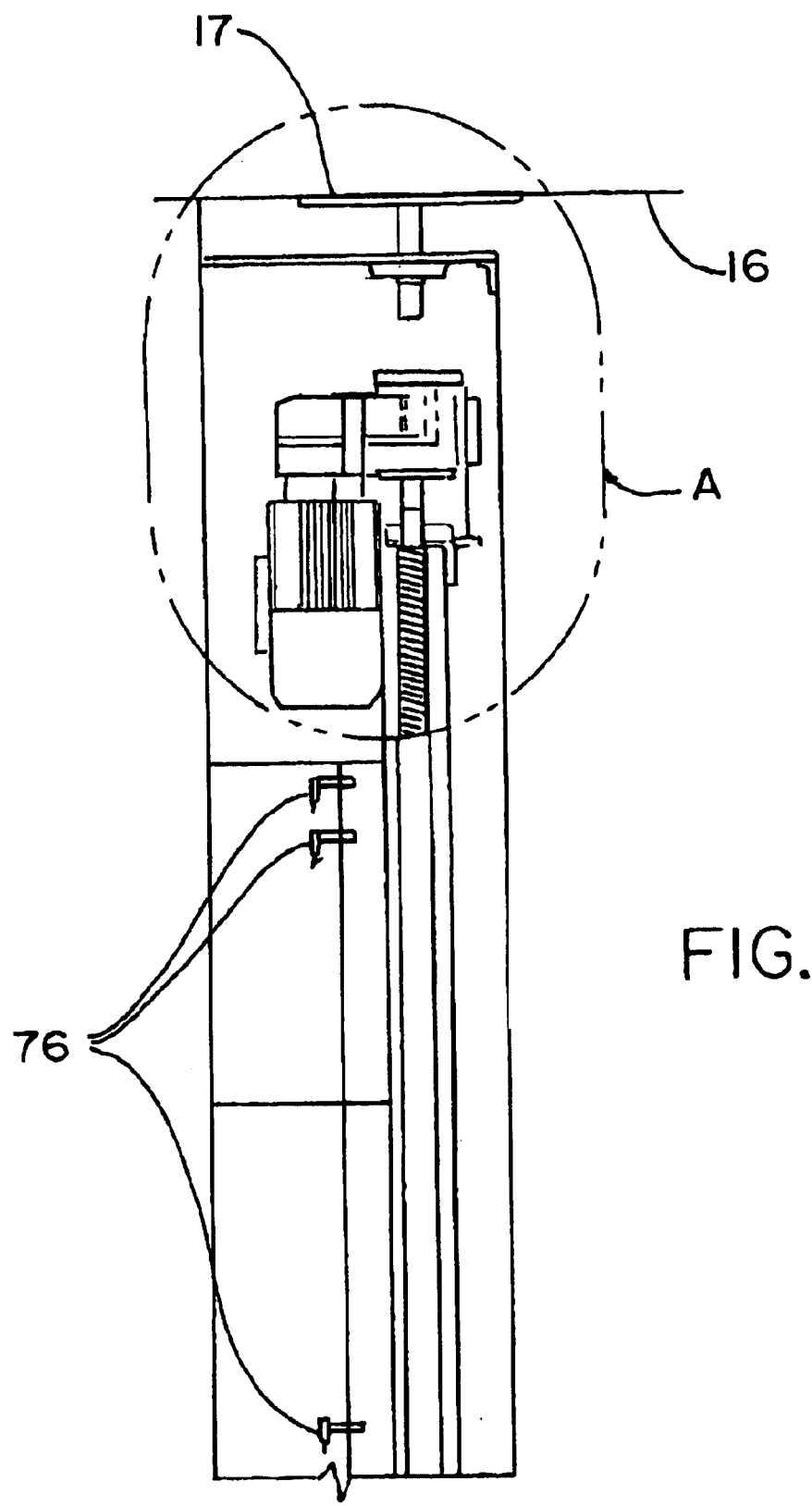
FIG. 1 is a side view of the apparatus of the present invention.

The apparatus 10 of the present invention has a column 11 that is generally vertically disposed and having a base end 13 that is adapted to rest on a floor by means of a floor plate 14. At the end of the column opposite the base end there is a top end 15 that is preferably anchored to the ceiling 16 by a ceiling plate 17. The column preferably has a front wall 18 a rear wall 19 and a pair of side walls 20 and 21. Although the column is depicted as generally square in the Figures, it will be appreciated by those skilled in the art that the column need not be square but can have other configurations including but not limited to rectangular and circular. Front wall 18 is provided with a slot 22 through which arm 23 is connected to the carriage 24. The slot extends from the vicinity of the base to the top end. The arm 23 travels in a vertical direction by means of the carriage 24 which resides within the column 11.

Figure 1C:
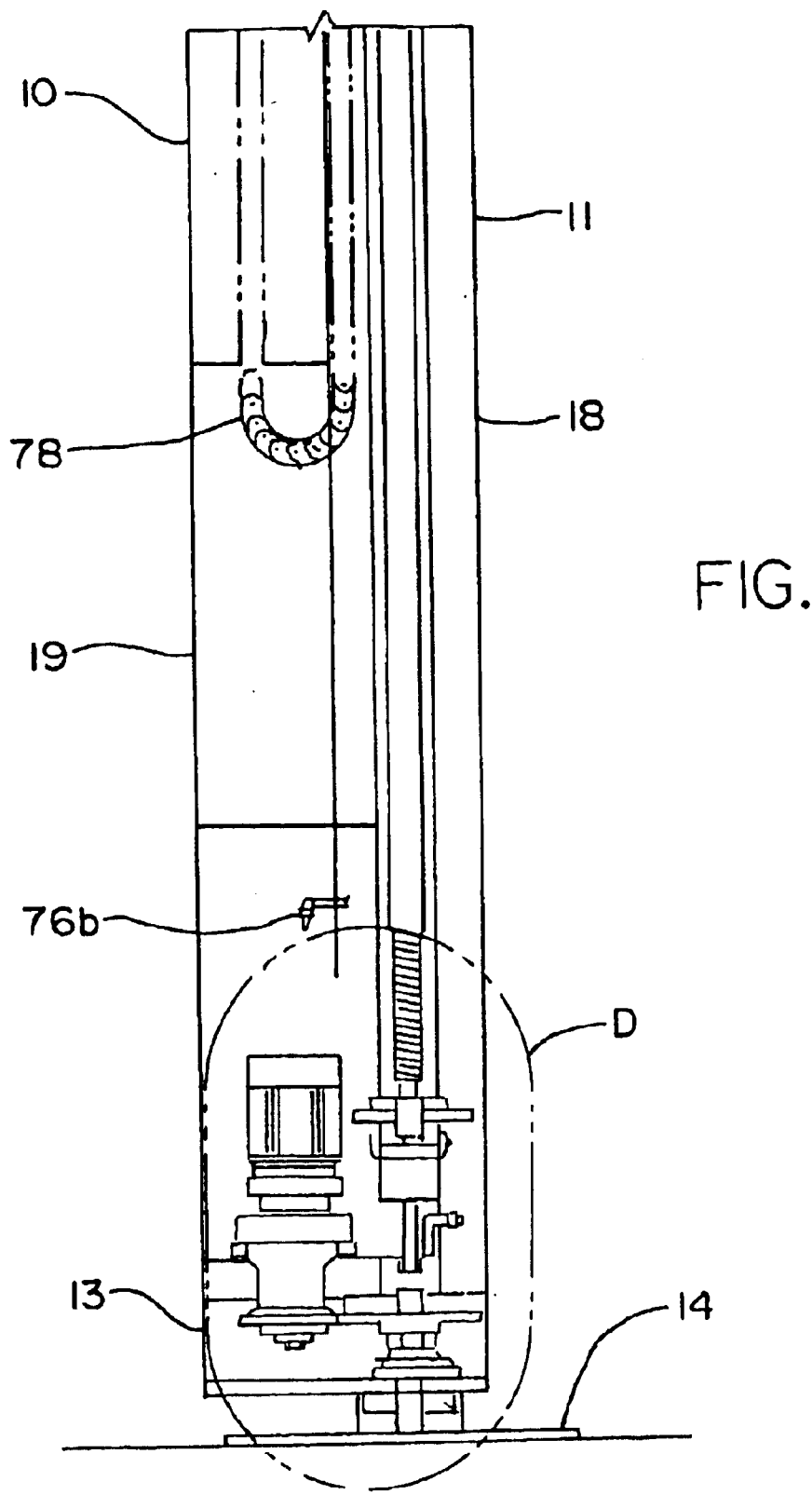
Figure 2:
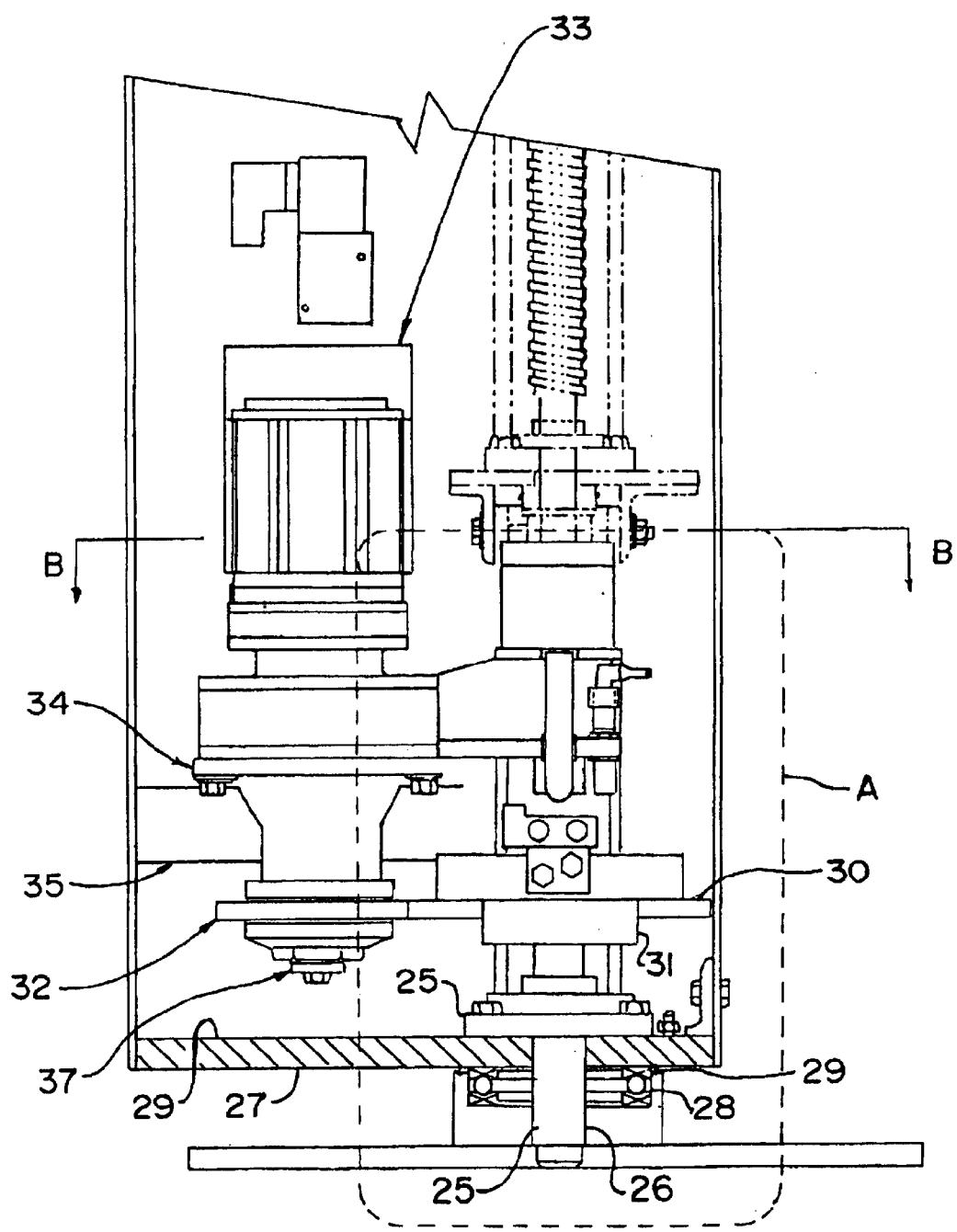
FIG. 2 shows Detail D of FIG. 1 which is an enlarged view of the base section column rotation assembly.

The column 11 rotates about the floor plate 14 and the ceiling plate 17 to give the arm a first range of travel in a horizontal plane. FIG. 2 detail "D" on FIG. 1 which is an enlarged view of the base section's column rotation assembly. The floor plate 14 has a pin 25 which is rotatably connected to the floor plate at the lower end 26 of the pin and passes through the bottom 27 of the column. On the underside 27 of the column the pin is held in position by a column rotating thrust bearing 28. A grease seal 29 at the underside of the column 11 protects the thrust bearing 28. On the inside of the column the pin 25 passes through a lower column radial bearing that is mounted to the bottom inside surface 29 of the column. The upper end of the pin 25 supports a spur gear 30 which is mounted on the spur gear adjustable stop mounting assembly 31. The spur gear 30 is rotated by the driven spur gear 32. As the spur gear 30 rotates the column also rotates about the floor plate. The driven spur gear is rotated by motor 33 which is held in place by the gear motor mounting plate 34. The gear motor mounting plate 34 is attached to the sidewall of the column by means of the gear motor mounting plate mounting angles 35. The drive shaft of the motor 33 has torque limiter 37 to retain the driven spur gear in place.

Figure 3:
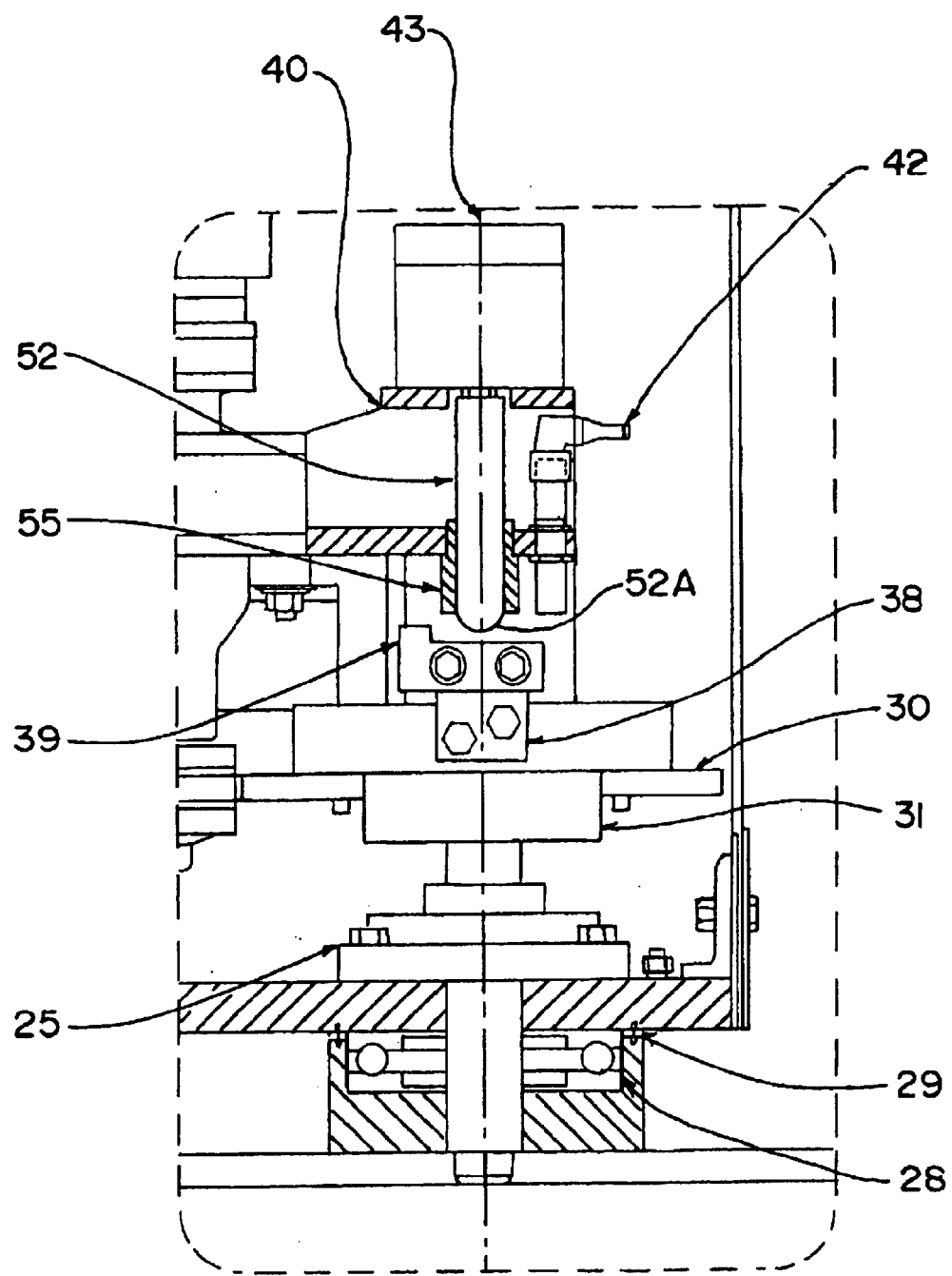
FIG. 3 shows detail A of the enlarged view of the column rotation assembly of FIG. 2.
Figure 4:
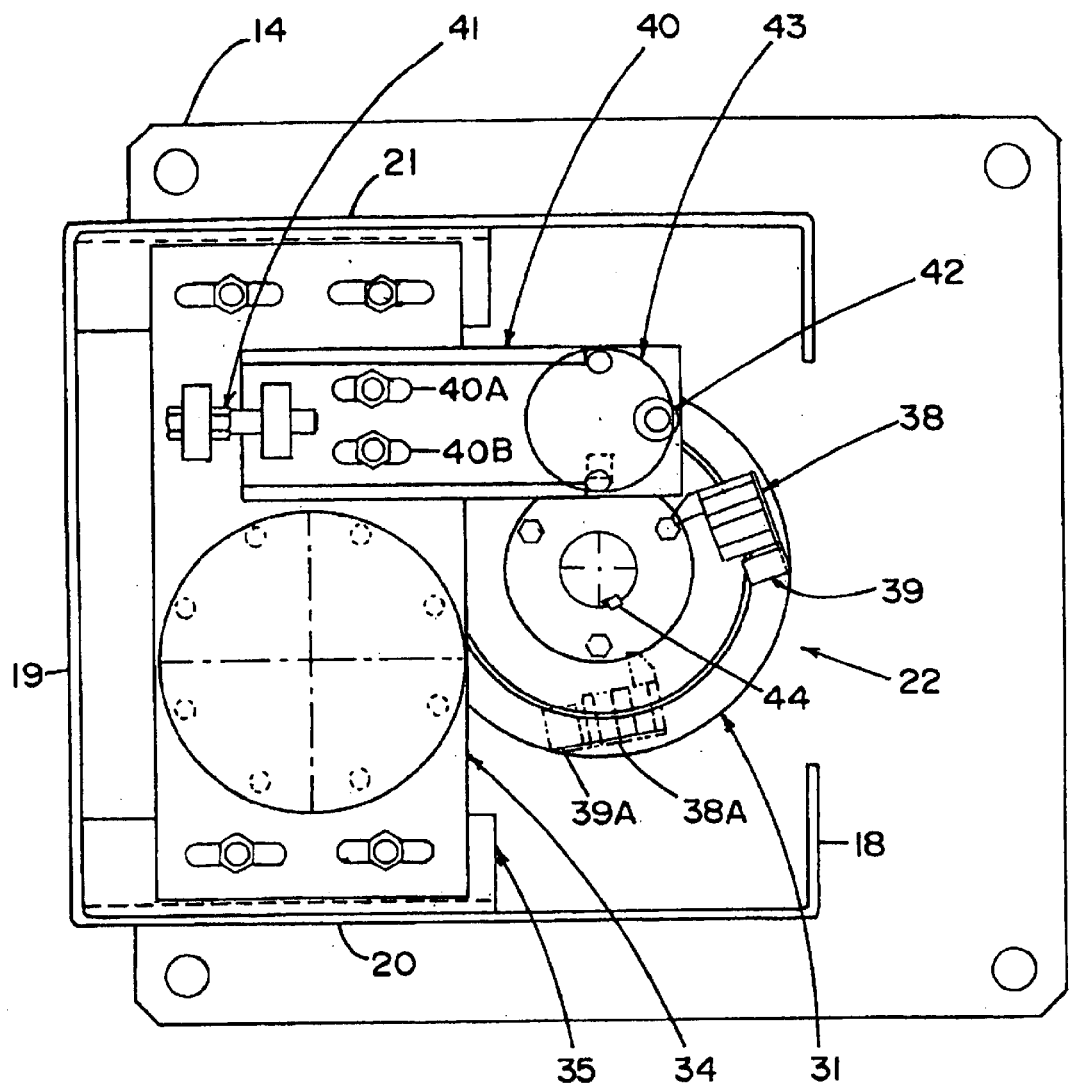
FIG. 4 is a view of the column rotation assembly taken along the line B—B of FIG. 2.
Figures 13, 13A:
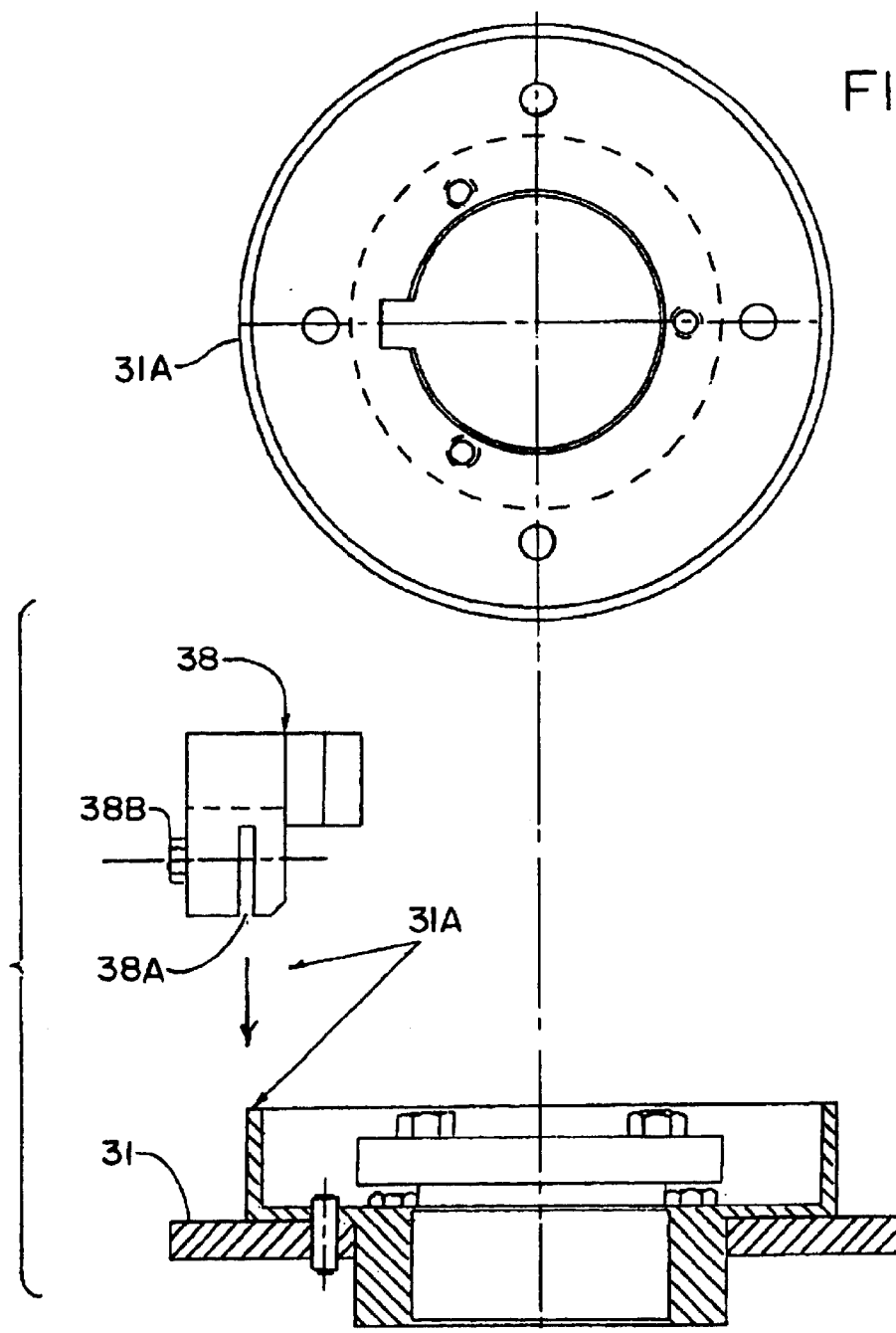
FIG. 13 is a plan view of the spur gear of the column rotation assembly.
FIG. 13A is a sectional view of the spur gear of FIG. 13.
Figure 14A:
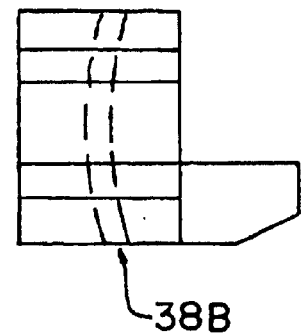
FIG. 14A is a top view of the adjustable stop block of the column rotation assembly.
Figure 14C:
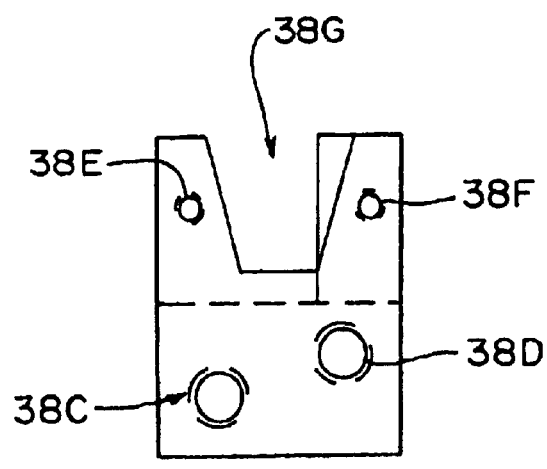
FIG. 14C is a rear view of the adjustable stop block of FIG. 14A.
Figure 14B:
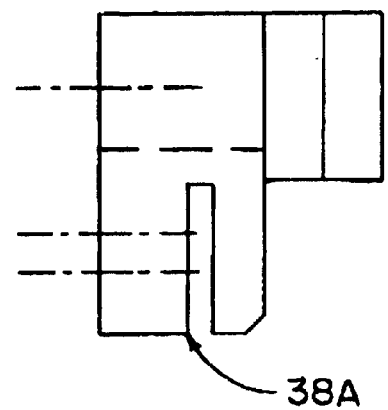
FIG. 14B is a side view of the adjustable stop block of FIG. 14A.

As noted above, the column is rotatable about the floor plate 14. The amount of rotation is governed by the column rotation assembly shown in FIG. 3. The spur gear adjustable stop mounting assembly 31 is a fixed disk on the rotating spur gear 30. The disk of the assembly 31 has a raised ring 31A that is provided with an adjustable stop block 38 which has mounted thereto a sensor flag 39. The disk of the assembly 31 typically has a pair of stop blocks 38 and 38A as seen in FIG. 4. The adjustable stop block arrangement is shown in more detail in FIGS. 13 through 14. The stop blocks have a slot 38B for receiving the raised ring 31A. Bolts 38C and 38D lock the block in place on the ring. Tapped holes 38E and 38F are for sensor flag mounting. The block also has a recess 38G for receiving a locking pin.

The gear motor mounting plate 34 has a piston/sensor mounting bracket 40 extending therefrom. The distance the piston/sensor mounting bracket 40 extends can be adjusted by means of the bracket position adjustment and locking screw 41. As can be seen from FIG. 3 the piston/sensor mounting bracket 40 has a pair of oblong orifices 40A and 40B for adjusting the placement of the piston/sensor mounting bracket 40 on the gear motor mounting plate. At the end of the piston/sensor mounting bracket 40 opposite the bracket position adjustment and locking screw 41 there is a column rotation limit sensor 42 and a locking pin piston 43 which are on the upper surface of the bracket. The locking pin piston 43 extends the locking pin 52 which mates with the cavity in the stop block 38. As the column is rotated by the motor, the column rotation limit sensor comes into contact with each of the sensor flags 39 and 39a as the spur gear 30 rotates. As the sensor hits the flag, the rotation of the column stops. In a preferred embodiment the arc of travel of the column is about 200 to 300° although the stop block can be adjusted to virtually any angle of rotation for the column. The key way 44 provided a method of aligning the pin 25 in the spur gear adjustable stop mounting assembly 31.

Figure 5:
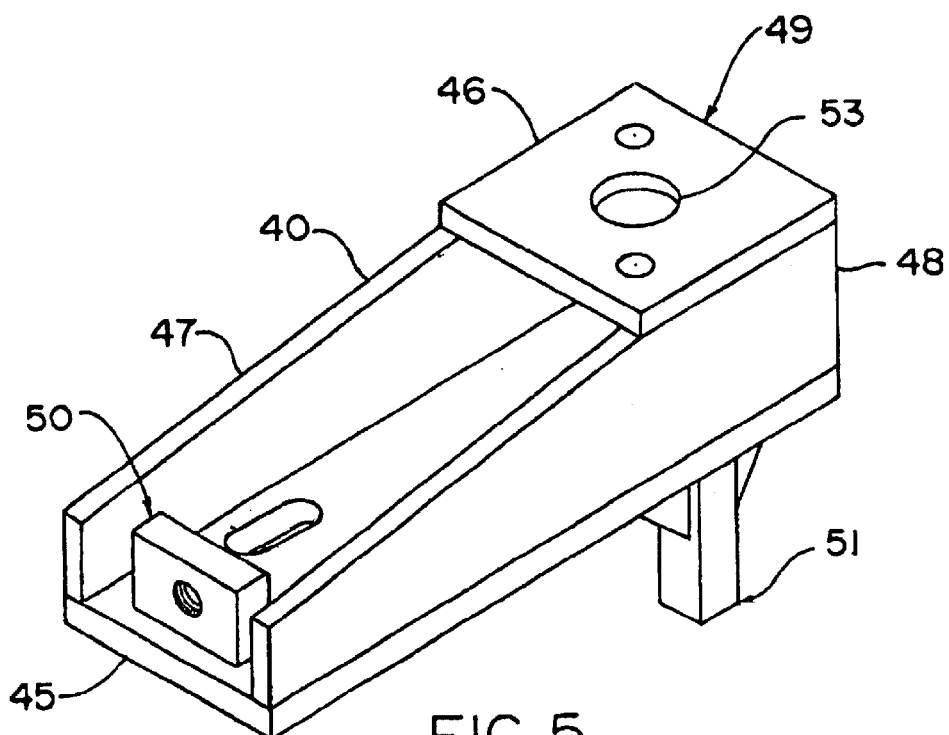
FIG. 5 is a top view of the piston/sensor bracket.
Figure 6:
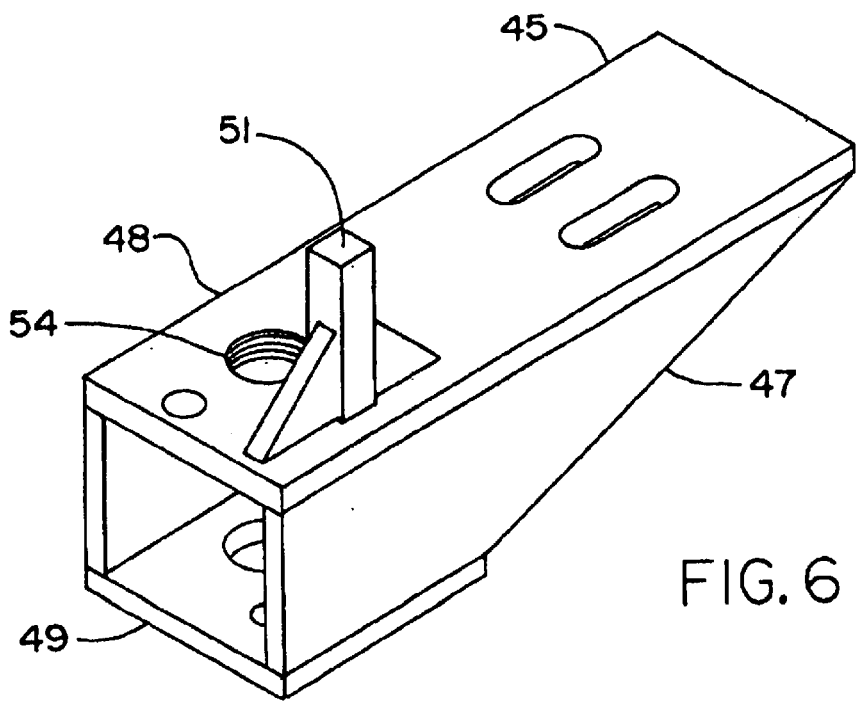
FIG. 6 is a bottom view of the piston/sensor bracket.

FIGS. 5 and 6 show the piston/sensor bracket 40 in more detail. The bracket preferably has base 45, a top 46 and a pair of side walls 47 and 48. The top 46 of the piston/sensor bracket 40 is the locking pin piston mounting plate 49. Between the two side walls 47 and 48 and extending upwardly from the base 45 is the bracket position adjustment and locking screw block 50. Extending from the underside of the base 45 of the piston/sensor bracket 40 is the adjustable stop block hard stop post 51. Locking pin 52 passes through the orifices 53 and 54 in the piston/sensor bracket 40. Attached to the pin 52 in the portion of the pin 52A extending from the piston/sensor bracket 40 is locking pin bushing 55. The locking pin 52A is connected to the locking pin piston or cylinder 43 by any suitable means such as a nose on the cylinder that is threaded into the pin. The locking pin piston or cylinder 43 locks in column rotation and prevents the column from rotating when such rotation is not desired.

Figure 7:
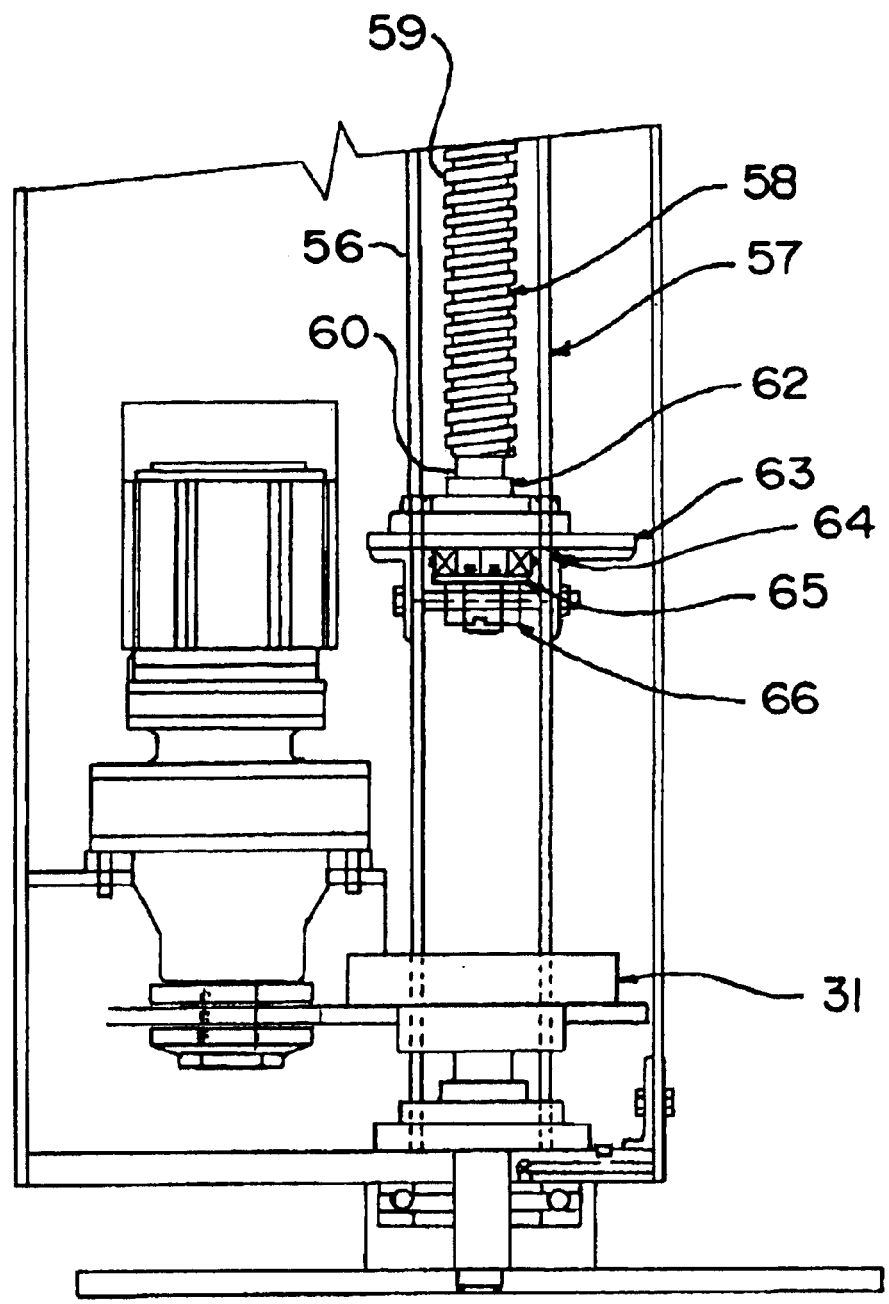
FIG. 7 is an enlarged view of the lower ball screw drive system of the present invention.

FIG. 7 shows the lower ball screw portion of the ball screw drive system. Extending from the base of the column is a pair of cam follower guides 56 and 57. These guides extend from the base up to the top of the column as seen in FIG. 1. The camfollower guides provide a channeled track for vertical travel of the lift carriage 67. Also, extending from the base to the top of the column is the ball screw 58. The ball screw 58 has a threaded portion 59 throughout virtually its entire length and a pair of end portions 60 and 61 at each end of the screw. Connected to the bottom end portion 60 of the ball screw 58 is a radial bearing 62, a lower ball screw mounting bracket 63, a grease retainer 64 and a lower ball screw thrust bearing 65. The lower ball screw mounting bracket 63 is mounted to the camfollower guides 56 and 57. At the end of the tip of the end portion of the ball screw is a castle nut 66 for adjusting the ball screw tensioning.

Figure 8:
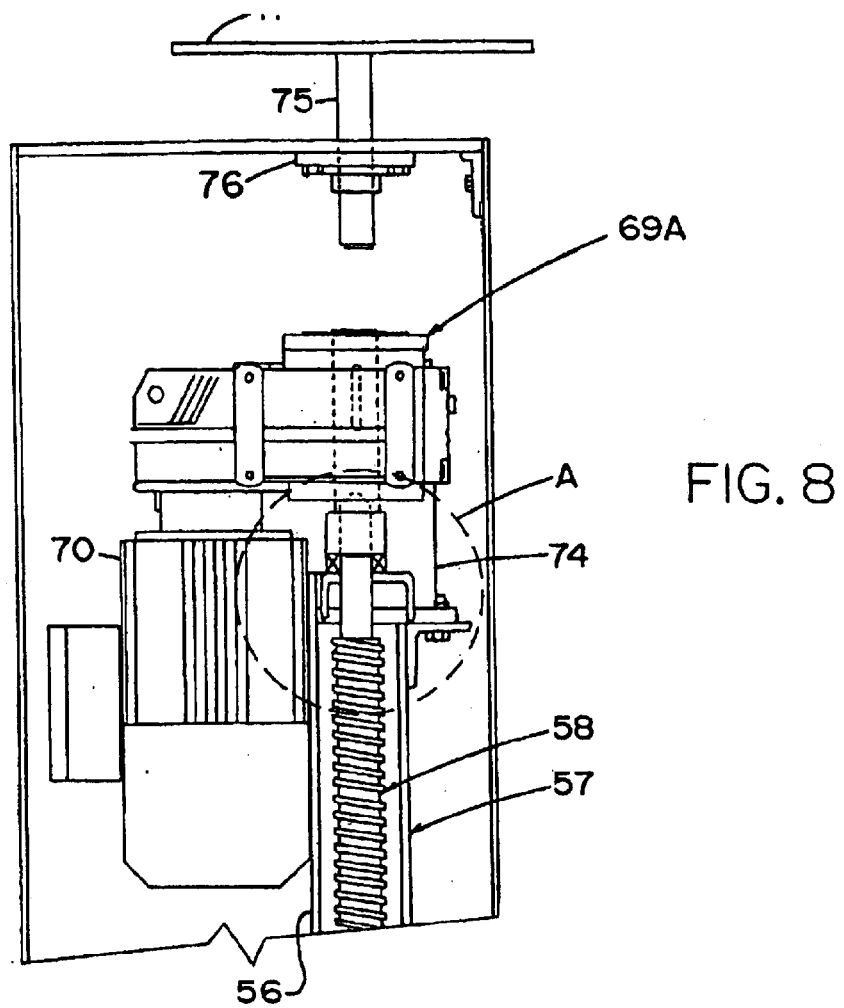
FIG. 8 is enlarged view of the upper ball screw drive system of the present invention.
Figure 8A:
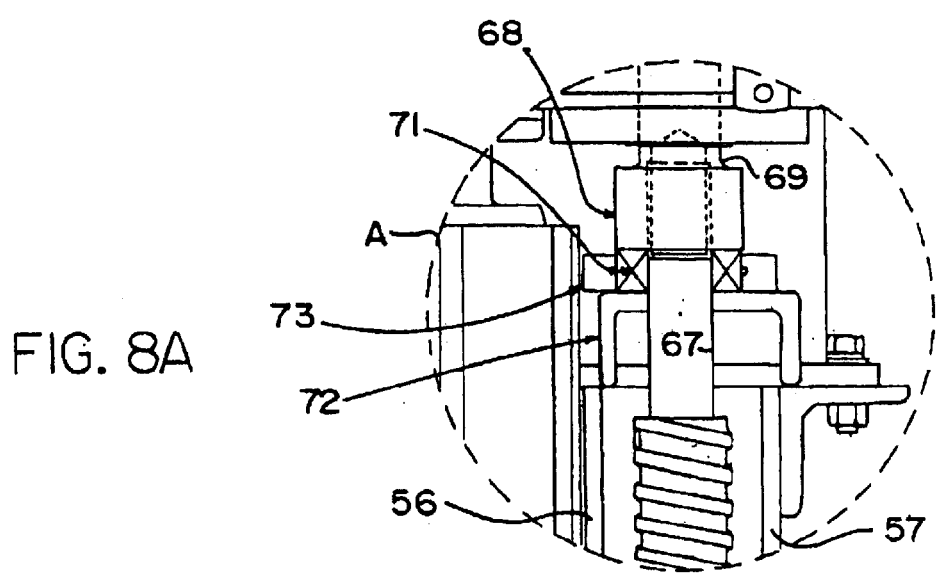
FIG. 8A is an enlarged view of Detail A of FIG. 8.

As seen in FIG. 8 attached to the upper end 67 of the ball screw 58 is a ball screw drive hub 68 which may be for example, a threaded nut. The ball screw drive hub 68 slips into the hollow gear motor output shaft 69. The drive hub 68 is keyed to the upper motor 70. The upper motor 70 drives the ball screw 58 which in turn raises and lowers the carriage 24. Supporting the ball screw drive hub 68 is upper ball screw thrust bearing 71 which hangs on the upper ball screw drive mounting assembly 72. Protecting the thrust bearing is the thrust bearing grease retainer 73. The upper ball screw drive mounting assembly 72 is mounted on top of the camfollower guides 56 and 57. The upper motor 70 is mounted on the column by the gear motor mounting bracket 74. The motor drives a gear (not shown) which in turn rotates the hollow output shaft 69. The motor may also be provided with a braking means 69A. The upper end of the column is connected to the ceiling 16 by means of the ceiling plate 17 and shaft 75 which extends from the ceiling plate. The rotation of the upper end of the column is provided by a radial bearing 76 at the end of the shaft 75.

The column of the present invention has a plurality of carriage height sensors 76 that monitor the height of the carriage 24 during its travel along the column. The carriage height sensor 76a senses when the carriage reaches its uppermost limit of travel. Similarly, carriage height sensor 76b senses when the carriage reaches its lower limit of travel In each instance, the sensors sense the location of the carriage and engage the drive motor brake 69A. The column junction box 77 provides electrical connections for the various components of the apparatus. Power is provided to the carriage by means of the power cables that reside in the cable track 78. The cable track is attached to the column by means of the cable track bracket set 79. The cable track 78 is preferably mounted approximately at the center of the height of the column so that there is sufficient play in the cable for the carriage to reach the uppermost and lowermost limits of the column without having unnecessary amounts of cable in the column. The carriage 24 has a frame 80 which has a plurality of camfollowers 81 that ride along the camfollower guides 56 and 57. The carriage is mounted on the ball screw by means of ball nut 82 and ball nut flange 83. As the upper motor turns the ball screw the ball nut and the ball nut flange either rise or are lowered. The ball nut flange 83 contacts the lift carriage assembly 84 at 85 during upward motion and raises the carriage. In the event the carriage reaches an obstruction as it is lowered the lift carriage assembly 84 ceases movement but the ball nut flange continues to move momentarily. As the flange continues to move without the lift carriage assembly a gap is created between the two. Flush mounted sensor 86 senses the gap and causes the upper motor to engage the drive motor brake.

The arm 87A is connected to plate 87 by any suitable means such as by bolting it on. The arm mechanism is seen in more detail in FIGS. 10 and 11. Arm rotate motor 88 has a brake and drives driver spur gear 89. The driver spur gear 89 is held in place by means of the torque limiter 90. The drive spur gear 89 drives driven spur gear 91 which is mounted on arm rotation bearing 92. Once the carriage has reached the selected location for emptying, the drive spur gear 89 can rotate causing the arm to be moved in a horizontal plane to fine tune the location. The split taper bushing 96 connects the spur gear to the pivot shaft 96A. Rotation stops 93 provide limits to the horizontal movement of the arm. Arm rotate sensors 94 sense the presence of the arm rotate sensor flag 95 and 95A which senses the range of rotation of the arm as the drum is tipping. The drum invert motor 97 provides the power to invert the drum, barrel, gaylord, etc. Drum inverter sensors 98 and 98A sense the presence of the drum inverter sensor flag 91 which governs the range of travel of the rotation of the drum for inversion purposes.

Figure 10B:
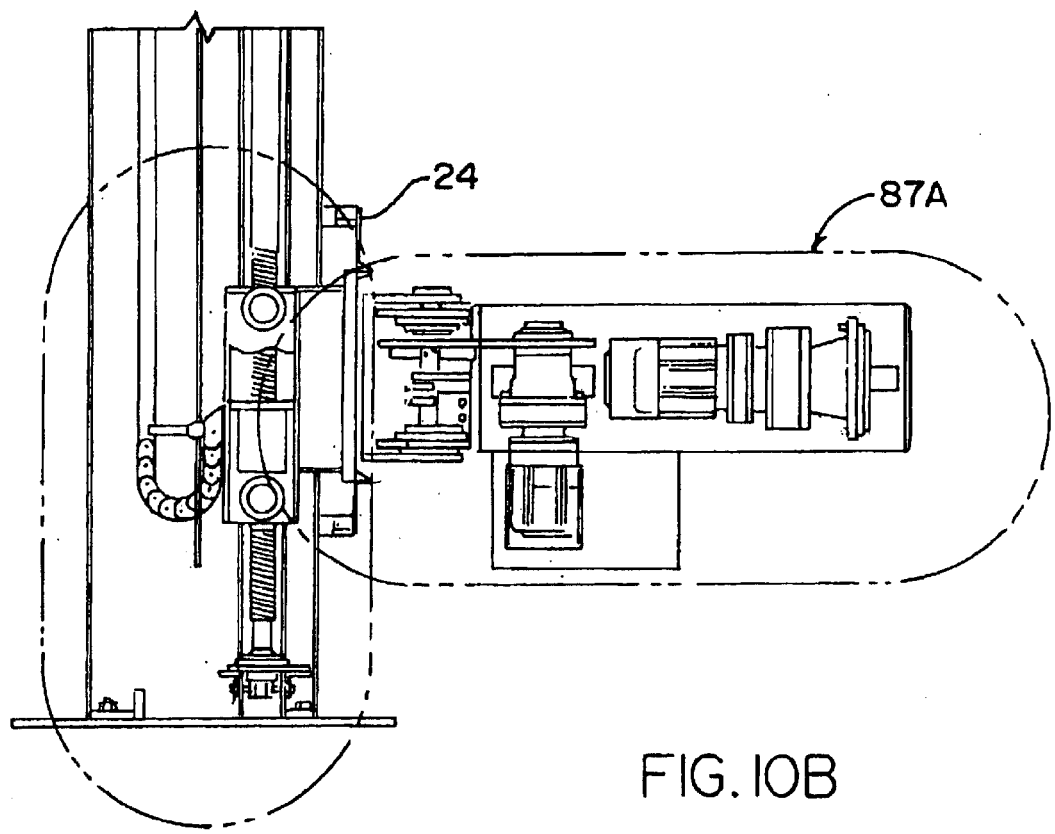
FIG. 10 is an alternate view of the column of FIG. 1 showing the arm and the cradle for holding a container.
Figure 10C:
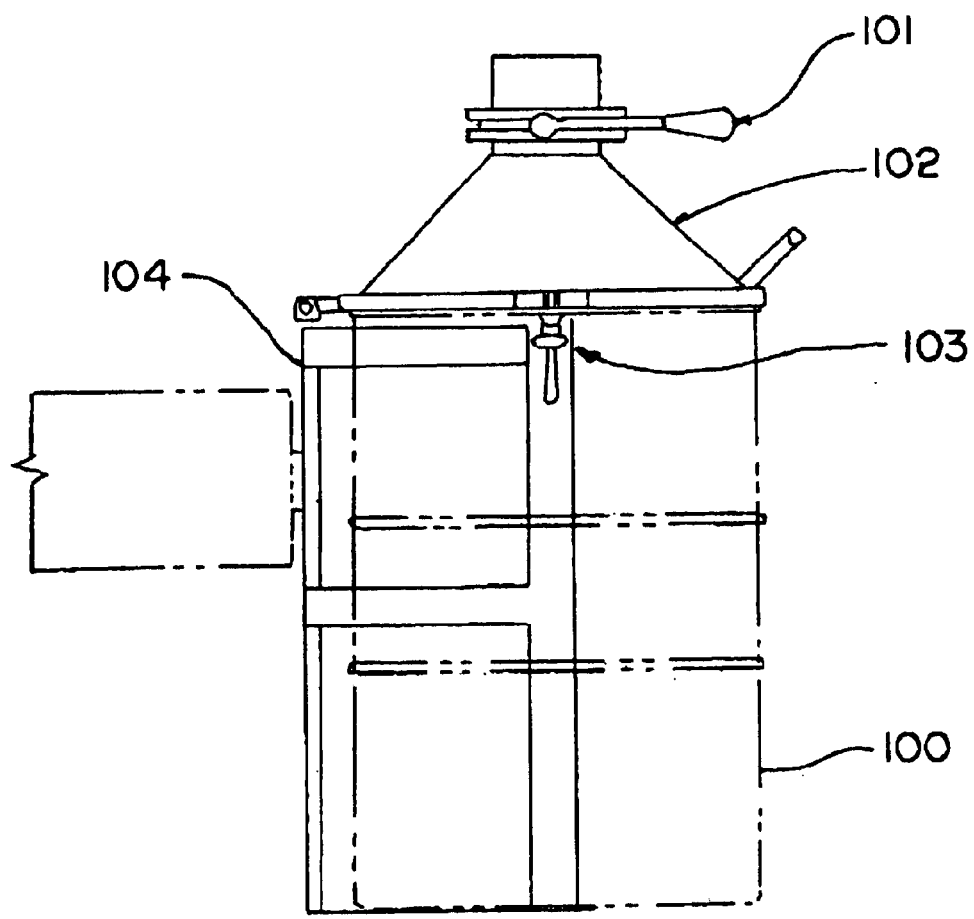
Figure 11:
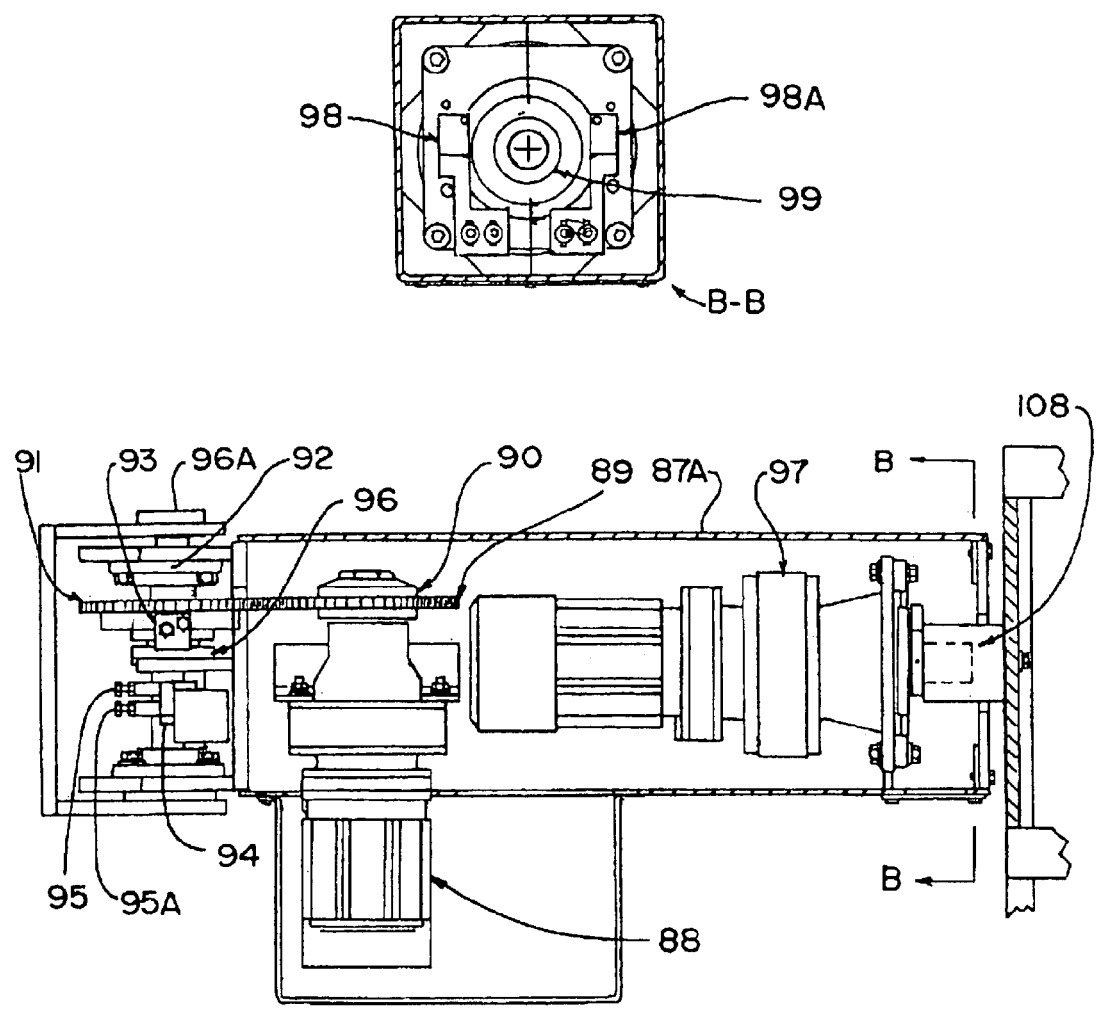
FIG. 11 is an enlarged view of the arm of FIG. 10.

The drum is depicted in more detail in FIGS. 10 and 12. The drum 100 may have a discharge valve 101 on top of the cone 102. The cone permits the material in the drum being discharged to be directed more specifically than if the top of the drum was entirely opened. Cone clamps 103 hold the cone 102 in place on the drum. The drum rests in the drum cradle 104 which is mounted to the arm by means of drum cradle rotation hub 108. The drum is held in place on the cradle 104 by means of the cone clamps 103. The cone clamps 103 are shown in more detail in FIGS. 12A and 12B wherein there is a floating hinge pin 106 which connects to the cone 102 at one end. The other end of the floating hinge pin 106 passes through a sleeve 105 in the cradle frame. The hinge pin 106 has a hinge pin stopping bolt 107 which prevent the pin from being removed from the sleeve. The pin 106 floats upwardly and downwardly in the sleeve 105 to accommodate various drum heights.

I claim:

1. An apparatus for inverting a container comprising a column that is generally vertically disposed and having a base end connected to a floor plate that is adapted to rest on a floor and a top end at the end of the column opposite the base end, said column being capable of rotating about said floor plate, said column having carriage adapted for vertical movement within said column, said carriage being connected to an arm, said arm having a first range of travel in a horizontal plane provided by rotation of said column about the floor plate, said arm having a first motor within said arm for providing a second range of travel in a horizontal plane, said arm having a second motor within said arm said second motor being adapted to invert a container such that the contents of the container may be removed.

2. The apparatus according to claim 1 wherein the top end of said column has a ceiling plate connected to a portion of a building structure, and said column rotates about said floor plate and said ceiling plate.

3. The apparatus according to claim 2 wherein the column has a front wall, a rear wall and a pair of side walls and wherein the front wall is provided with a slot through which the carriage connects to the arm.

4. The apparatus according to claim 3 wherein the slot extends from the vicinity of the base to the vicinity of the top end of the column.

5. The apparatus according to claim 2 wherein the amount of rotation of the column is governed by a column rotation assembly which comprises a spur gear adjustable stop mounting assembly having a disk on a rotating spur gear, said disk having a raised ring that is provided with at least one adjustable stop block which has mounted thereto a sensor flag.

6. The apparatus according to claim 5 wherein the disk of the assembly has a pair of stop blocks.

7. The apparatus according to claim 6 wherein the stop blocks have a slot for receiving the raised ring.

8. The apparatus according to claim 7 wherein there is a column rotation limit sensor and as the column is rotated by a motor, the column rotation limit sensor comes into contact with a sensor flag, the rotation of the column stops.

9. The apparatus according to claim 7 wherein the stop block can be adjusted to virtually any angle of rotation for the column.

10. The apparatus according to claim 1 wherein the vertical movement of the carriage is provided by a ball screw.

11. The apparatus according to claim 10 wherein the ball screw is driven by an upper motor in the vicinity of the top of said column.

12. The apparatus according to claim 11 wherein there is a plurality of carriage height sensors that monitor the location of the carriage during its travel along the column.

13. The apparatus according to claim 12 wherein a cable track mounted generally at the center of the height of the column provides hold electrical cable for providing power to the arm.

14. The apparatus according to claim 12 wherein the carriage is mounted on the ball screw by means of a flange and wherein in the event the carriage reaches an obstruction as it is lowered the carriage ceases movement but the flange is adapted to continue to move and wherein a sensor senses a gap between the carriage and the flange.

15. The apparatus according to claim 1 wherein the first range of travel and the second range of travel are different.

16. An apparatus for inverting a container comprising a column that is generally vertically disposed and having a base end connected to a floor plate that is adapted to rest on a floor and a top end at the end of the column opposite the base end, said column being capable of rotating about said floor plate, said column having a carriage adapted for vertical movement within said column, said carriage being connected to an arm, said arm having a first motor within said arm for providing a range of travel in a horizontal plane, said arm having a second motor within said arm said second motor causing a container to be inverted so that the contents of the container may be removed.

17. An apparatus for inverting a container comprising a column that is generally vertically disposed and having a base end connected to a floor plate that is adapted to rest on a floor and a top end at the end of the column opposite the base end, said column being capable of rotating about said floor plate, said column having a carriage adapted for vertical movement within said column, said carriage being connected to an arm, said arm having a first range of travel in a horizontal plane provided by rotation of said column about the floor plate, said arm having a first motor for movement in a horizontal plane and a second motor for inverting a container such that the contents of the container may be removed.

18. An apparatus for inverting a container comprising a column that is generally vertically disposed and having a base end connected to a floor plate that is adapted to rest on a floor and a top end at the end of the column opposite the base end, said column being capable of rotating about said floor plate, said column having a carriage adapted for vertical movement within said column, said carriage being connected to an arm, said arm having a first range of travel in a horizontal plane provided by rotation of said column about the floor plate, said arm having a first motor for movement in a horizontal plane and a second motor for inverting a container such that the contents of the container may be removed, wherein an end of the arm near the container is provided with at least one drum invertor sensor that interacts with a drum invertor flag to govern rotation of the drum.

* * * * *